(12) United States Patent
Lee (10) Patent No.: US 10,697,537 B2
(45) Date of Patent: Jun. 30, 2020

(54) SWITCHABLE CLUTCH ASSEMBLY (71) Applicant: SCHAEFFLER TECHNOLOGIES AG & CO. KG, Herzogenaurach (DE)

(72) Inventor: Brian Lee, York, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 143 days.

(21) Appl. No.: 16/106,303

(22) Filed: Aug. 21, 2018

(65) Prior Publication Data
US 2020/0063860 A1 Feb. 27, 2020

(51) Int. Cl.
*F16D 41/063* (2006.01)
*F16H 45/02* (2006.01)
*F16D 41/08* (2006.01)
*F16H 61/14* (2006.01)
*F16H 45/00* (2006.01)

(52) U.S. Cl.
CPC .......... *F16H 61/14* (2013.01); *F16D 41/063* (2013.01); *F16D 41/082* (2013.01); *F16H 2045/002* (2013.01); *F16H 2045/0289* (2013.01)

(58) Field of Classification Search
None
See application file for complete search history.

(56) References Cited

U.S. PATENT DOCUMENTS

| 4,620,621 A * | 11/1986 | Kulczycki | F16D 41/08 192/105 BA |
|---|---|---|---|
| 7,987,958 B2 | 8/2011 | Hemphill et al. | |
| 10,337,597 B2 * | 7/2019 | Samie | F16D 27/10 |
| 2009/0223768 A1 | 9/2009 | Itomi | |
| 2018/0180110 A1 | 6/2018 | Lee et al. | |
| 2018/0180111 A1 | 6/2018 | Ince et al. | |

FOREIGN PATENT DOCUMENTS

| CN | 1482374 A | 3/2004 |
|---|---|---|
| KR | 1020050022286 A | 3/2005 |

* cited by examiner

*Primary Examiner* — David R Morris
*Assistant Examiner* — James J Taylor, II
(74) *Attorney, Agent, or Firm* — Brooks Kushman P.C.

(57) ABSTRACT

A clutch assembly for selectively transmitting torque between an engine and a torque converter is provided. A first plate is non-rotatably connected to a torque converter cover. A second plate is configured to receive a torque input from an engine. A wedge clutch is disposed axially between the first and second plates and is configured to selectively transfer torque between the first plate and the second plate. The wedge clutch includes wedge segments that are configured to collectively radially expand and contract to selectively transfer torque between the first plate and the second plate.

20 Claims, 7 Drawing Sheets

SWITCHABLE CLUTCH ASSEMBLY

TECHNICAL FIELD

The present disclosure relates to various components configured to be located between an engine and a transmission in an automotive vehicle. In particular, a switchable clutch assembly is provided between the engine and a torque converter.

BACKGROUND

Automotive vehicles with automatic transmissions are known to be equipped with a torque converter. The torque converter is a fluid coupling which can transfer rotating power from an engine to an automatic transmission. A flexplate is a plate that connects an output of the engine with the input of the torque converter.

SUMMARY

In one embodiment, a clutch assembly for selectively transmitting torque between an engine and a torque converter is provided. A first plate is non-rotatably connected to a torque converter cover. A second plate is configured to receive a torque input from an engine. A wedge clutch is disposed axially between the first and second plates and is configured to selectively transfer torque between the first plate and the second plate. The wedge clutch includes an inner race having an outer surface defining an annular groove, an outer race concentric with the inner race and having an inner surface defining a plurality of tapered surfaces tapered in a circumferential direction, as well as a plurality of wedge segments. Each wedge segment has an inner surface disposed within the groove in a sliding engagement, and each wedge segment has a tapered outer surface tapered in the circumferential direction and engaged with a corresponding one of the plurality of tapered surfaces of the outer race. The wedge segments are configured to collectively radially expand and contract to selectively transfer torque between the first plate and the second plate.

In another embodiment, a clutch assembly for selectively transmitting torque between an engine and a torque converter is provided. A first plate is configured to non-rotatably connect with a torque converter. A second plate is configured to non-rotatably connect with an engine output. A wedge clutch is configured to selectively transfer torque between the first plate and the second plate. The wedge clutch includes a first race having a first surface defining an annular groove, and a second race concentric with the first race and having a second surface defining a plurality of ramped surfaces. The wedge clutch also includes a plurality of wedge segments, each wedge segment contacting the annular groove and a respective one of the ramped surfaces, wherein the wedge segments are configured to collectively radially expand and contract to selectively transfer torque between the first plate and the second plate.

In yet another embodiment, a system for selectively transferring torque between an engine and a torque converter is provided. The system includes a torque converter rotatable about an axis and having a cover. A first plate is configured to receive torque from an engine and transfer the torque to the torque converter. A second plate is disposed axially between the first plate and the cover and directly connected to the cover. A clutch is disposed axially between the first plate and the second plate. A piston is disposed within the cover and configured to move axially within the cover. An actuator plate is coupled to the piston to move axially with the piston. The actuator plate is configured to, in response to movement of the piston, switch the clutch between (1) a locked mode in which torque is transferable between the first plate and the second plate, and (2) an unlocked mode in which torque is not transferable between the first plate and the second plate in at least one rotational direction.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
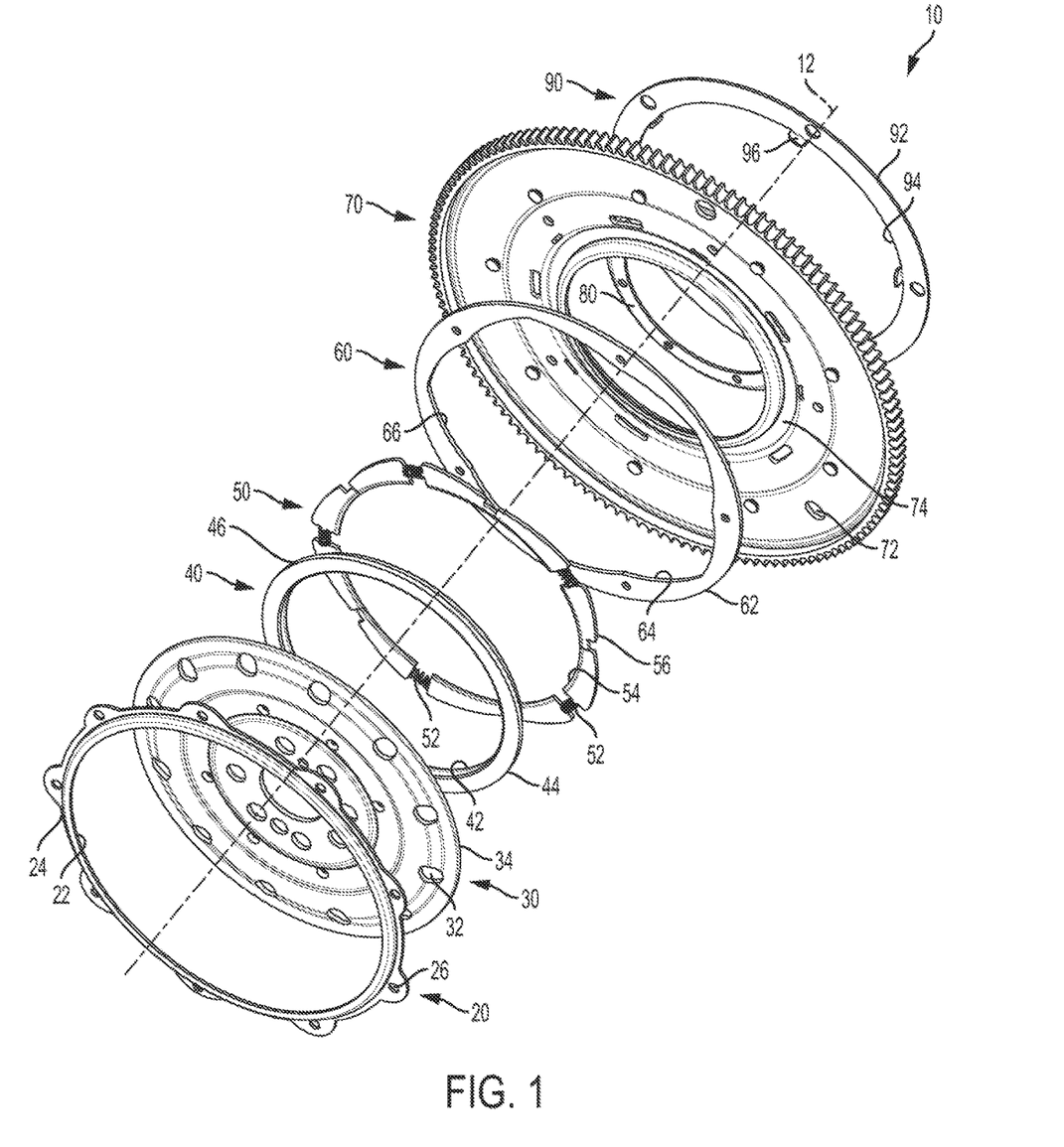
FIG. 1 is an exploded perspective view of switchable clutch assembly (e.g., including wedge clutch) for selectively connecting a power source (such as an engine) with a torque converter, according to one embodiment.

As will be described below, a central axis 12 is shown in FIG. 1. Various components can rotate about this central axis 12. Words such as "axial," radial," and "circumferential" refer to directions relative to the axis 12 or parallel to those directions. For example, an element extending "axially" means that the element extends along the central axis 12 or in a direction parallel to the axis 12.

Traditionally, internal combustion engines (namely, the crankshaft) is connected to a torque converter via a flexible plate (flexplate). The flexplate allows for the transfer of torque between the engine and the torque converter while also accommodating some amount of axial movement that comes with the operation of the torque converter. Typical flexplates are rigidly connected to both the engine and the torque converter. Thus, if the engine is rotating, so is the torque converter (and vice versa).

In certain hybrid vehicles, an electric motor can drive the transmission with or without assistance from the engine. The electric motor may be located in-line between the engine and the transmission. However, allowing the electric motor to drive the transmission would also require the electric motor to backdrive the engine due to the fixed connections between the torque converter, flexplate, and engine. A clutch to selectively enable the engine to be disconnected from the flexplate, and thus the torque converter, would allow the electric motor to operate the transmission without backdriving the engine, thus improving the efficiency of the vehicle.

Therefore, according to various embodiments, this disclosure is directed to a clutch assembly configured for integration between the torque converter and the engine of a vehicle. In some embodiments, the flex plate is split and the clutch assembly is integrated with the split flex plate. In other embodiments, the clutch is integrated between the damper and the torque converter. The clutch assembly described below allows torque passing through the flexplate to be selectively disconnected. In other words, when the clutch is open or disengaged, torque does not pass between the torque converter and the engine. And, when the clutch is closed or engaged, torque is enabled to pass between the torque converter and the engine.

FIG. 1 shows one embodiment of a clutch assembly 10 between an engine output and a torque converter input; namely, in this embodiment, a flexplate is provided with a clutch integrated therewith. The switchable clutch assembly 10 and its various components are rotatable about a central axis 12. In this particular embodiment, the switchable clutch assembly 10 includes an outer diameter (OD) bushing 20, a first plate or inner plate 30, a clutch inner hub 40, a wedge plate or plurality of wedge segments 50, a clutch outer race 60, a second plate or outer plate 70, an inner diameter (ID) bushing 80, and an actuator plate 90. These components will be described below, and make up the various components of the switchable clutch assembly. The assembly of FIG. 1, or parts thereof, can be generally referred to as a clutch assembly, as will be described below.

Figure 2A:
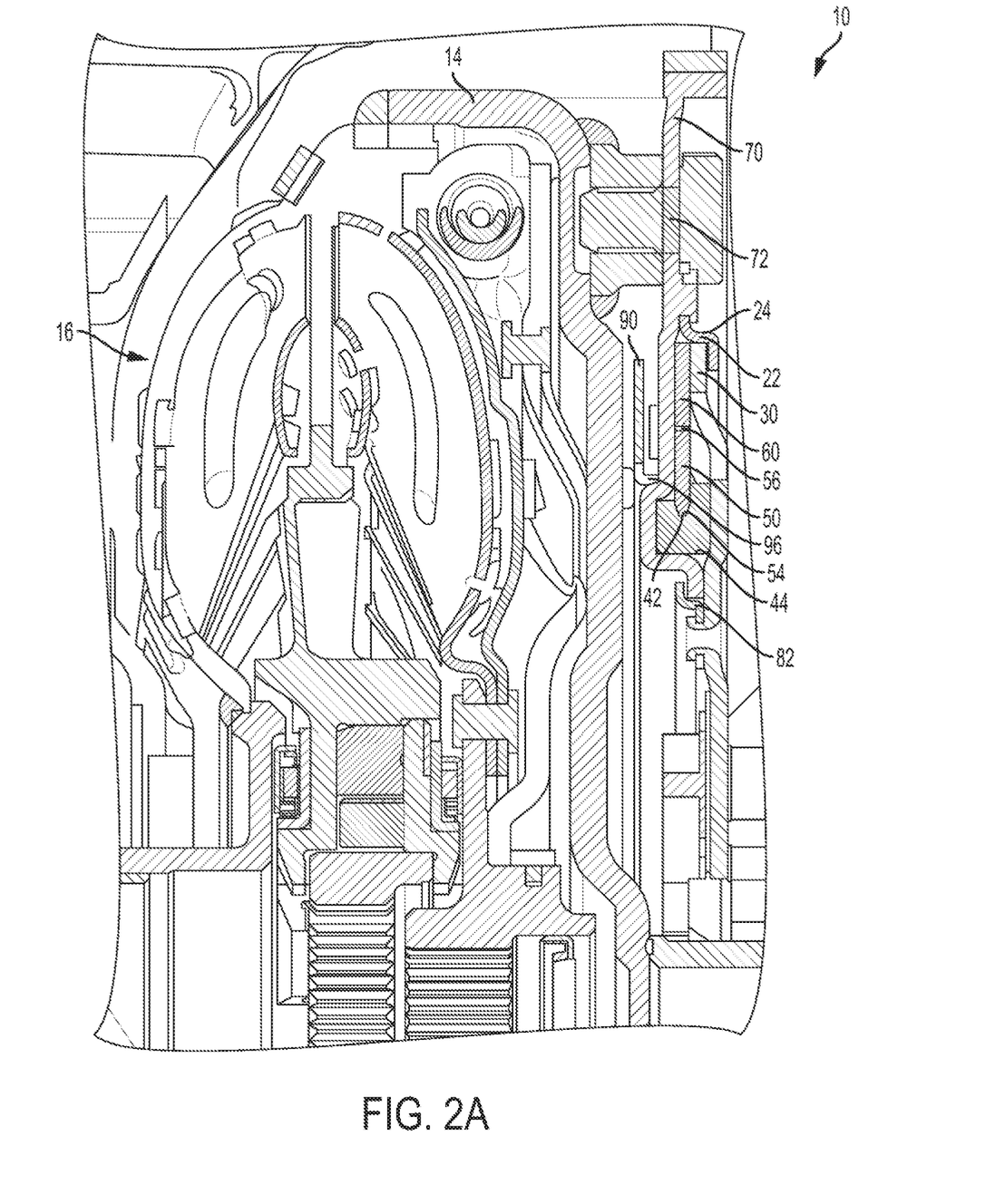
FIG. 2A is a first cross-sectional view of the switchable clutch assembly of FIG. 1.
Figure 2B:
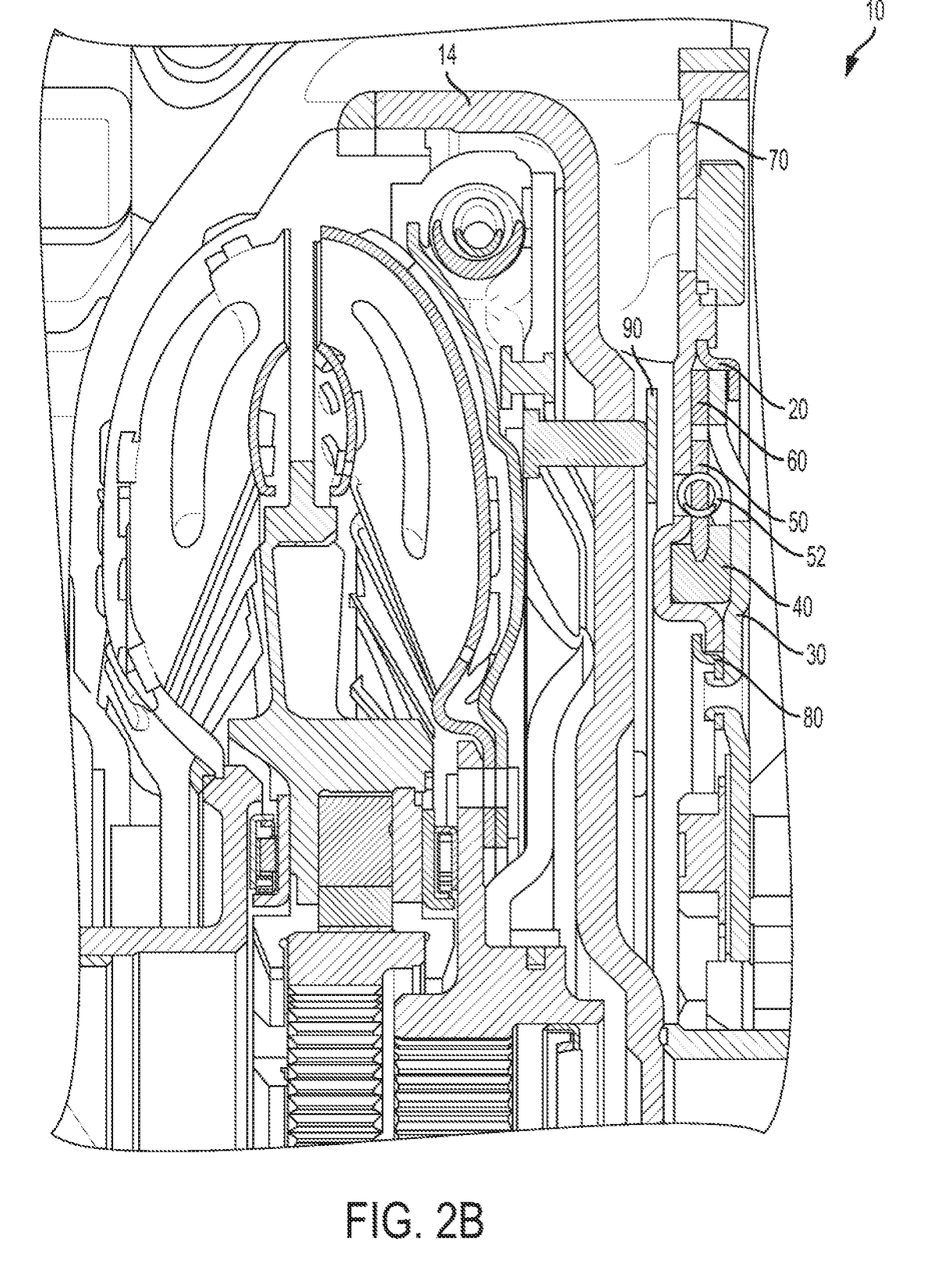
FIG. 2B is a second cross-sectional view of the switchable clutch assembly of FIG. 1.
Figure 3:
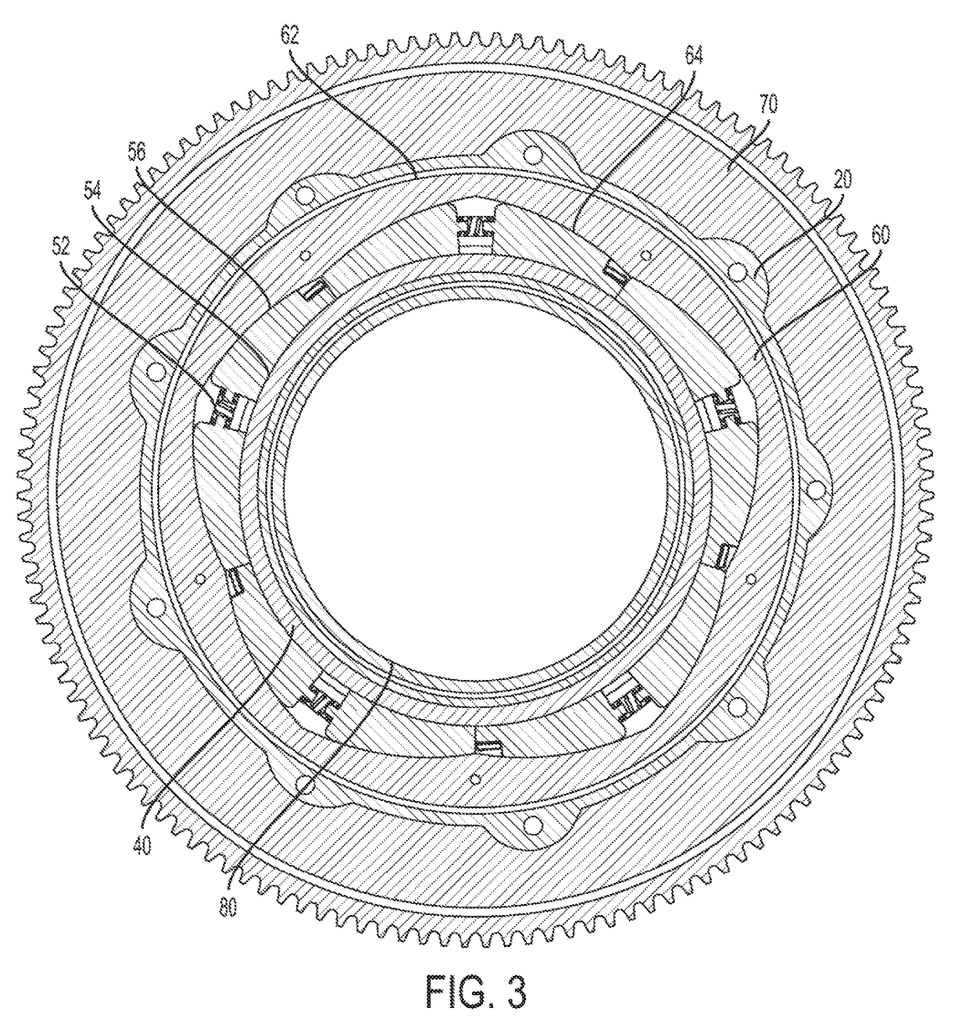
FIG. 3 is a front plan view of the switchable clutch assembly with the inner plate removed for clarity, according to one embodiment.

Referring to FIGS. 1-3, the switchable clutch assembly 10 includes a split-plate flexplate. In other words, while typical flexplates have a single plate that is mounted to both the engine and the torque converter, the flexplate of this disclosure includes two separate plates, namely inner plate 30 and outer plate 70. The inner plate 30 is mounted directly to the engine (e.g., crankshaft) so that the inner plate 30 rotates with the engine. Fasteners such as bolts can pass through openings 32 and into the crankshaft. Meanwhile, the outer plate 70 is mounted directly to the torque converter. Fasteners such as bolts can pass through openings 72 and into the outer cover 14 of the torque converter 16, for example. The inner plate 30 and the outer plate 70 are rotatable independent of one another when the clutch is open. As will be described further below, the clutch within the flexplate allows the inner plate 30 (and thus the engine) to be selectively separated from the outer plate 70 (and thus the torque converter 16).

The OD bushing 20 defines an outer region of the clutch, housing the clutch outer race 60. In particular, the OD bushing 20 defines an inner surface 22 facing the axis 12. The inner surface receives a corresponding outer surface 34 of the inner plate 30. The OD bushing 20 has an outer surface 24 that faces away from the axis, and is received within the outer plate 70. The OD bushing 20 facilitates sliding interaction between the outer plate 70 and the inner plate when the clutch is open to allow for such relative rotational movement. The OD bushing 20 may also be fastened (e.g., bolted, screwed, riveted etc.) to the outer plate 70 via apertures 26 in the bushing 20 that receive the fasteners. In one embodiment, the outer plate 70 has pegs that face axially toward the OD bushing 20 and are received within the apertures 26 to radially locate the outer plate 70 to the bushing 20.

The ID bushing 80 defines an inner region of the clutch. In particular, the ID bushing 80 includes an outwardly-facing surface 82 facing away from the axis 12. The surface 82 contacts an inwardly-facing surface of the outer plate 70 such that the ID bushing 80 is disposed radially inward of the outer plate 70. The ID bushing 80 also allows for and facilitates relative rotation between the outer plate 70 and the inner plate 30 when the clutch is open or disengaged.

The OD bushing 20 and the ID bushing 80 collectively contain the wedge clutch described below, which includes the clutch inner hub 40, the wedge plate or plurality of wedge segments 50, and the clutch outer race 60. The clutch assembly can include the wedge clutch, as well as the actuation plate, and the split plates of the flexplate.

The clutch inner hub 40 is bound axially by the inner plate 30 and the outer plate 70. The inner hub 40 may be non-rotatably fixed (e.g., pegs fasteners) to the inner plate 30. The outer plate 70 may have an annular recess 74 configured to contain and locate the inner hub 40. In the illustrated embodiment, the clutch inner hub 40 has an inner surface 42 slidingly engaging an outerwardly-facing surface of the outer plate 70. The inner hub 40 has an outer surface 44 that defines an annular groove 46. The groove 46 may be tapered. In one embodiment, the groove 46 may have side surfaces that are angled axially such that they do not extend perpendicular to the axis 12. This accommodates for the tapered or wedge-shaped nature of the wedge segments 50 which are further described below. The groove 46 acts as an inner race for the wedge segments, radially opposed to the clutch outer race 60 which acts as the outer race for the wedge segments.

The outer race 60 radially contains the wedge segments 50. The outer race 60 has an outer surface 62 that is generally circumferential. The outer race 60 may be non-rotatably fixed (e.g., pegs or fasteners) to the outer plate 70; alternatively, the outer race 60 can be configured to rotate within the outer plate 70 and the OD bushing 20. The outer race 60 has an inner surface 64 that includes a plurality of tapered surfaces 66, as can be seen in FIG. 1. The tapered surfaces 66 are arranged such that the radial thickness of the outer race 60 alters along the circumferential direction about the axis 12. Each tapered surface 66 tapers in a direction circumferentially opposite than an adjacent tapered surface 66. The tapered surfaces 66 collectively define several valleys and apexes about the inner surface 64. Each individual tapered surface 66 engages a respective one of the wedge segments 50, and in particular, contacts an outer surface of one of the wedge segments 50.

Figure 4A:
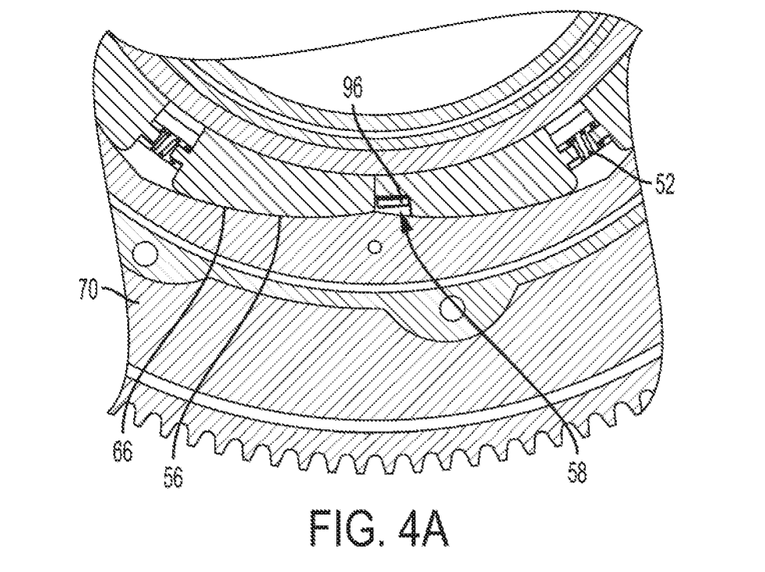
FIG. 4A is a plan view of a segment of the switchable clutch assembly of FIG. 3, in which the clutch is in a locked mode.

The wedge segments 50 are arranged circumferentially about the axis 12. Because the wedge segments 50 can be directly or indirectly connected to one another, the wedge segments 50 can collectively be referred to as a wedge plate. In the illustrated embodiment, pairs of wedge segments 50 are separated from one another via springs 52. However, in another embodiment, the wedge segments 50 are part of a single, continuous wedge plate that is formed to be spring-biased in a radial direction, and can be bound against its bias by a retaining spring. Referring back to FIGS. 1-3, the wedge segments are arranged in pairs. Each wedge segment 50 is circumferentially adjacent to one of the springs 52, and is also circumferentially adjacent to another one of the wedge segments (with a gap therebetween, as discussed below). Each wedge segment 50 has an inner surface 54 that is partially-cylindrical in shape, such that the wedge segments can collectively rotate about the groove formed in the inner hub 40. The inner surfaces 54 may be narrowed, tapered, or beveled so as to fit within the annular groove 46. Each wedge segment 50 also has an outer surface 56 that is circumferentially tapered to match the inner surface of the outer race 60. The outer surfaces 56 of the wedge segments 50 are tapered such that each wedge segment 50 has a radial thickness that either increases or decreases in the circumferential direction about the axis 12. This allows the outer surfaces 56 of the wedge segments 50 to slide circumferentially along a respective one of the tapered surfaces 66 of the outer race 60. The wedge plate also includes cut-outs, gaps, pockets, or notches (hereinafter referred to as gaps) 58 between two adjacent wedge segments 50. The gaps 58 may create a void entirely separating two adjacent wedge segments 50; alternatively, as shown in FIG. 4A, the gaps 58 may create a void that only separates a portion of two adjacent wedge segments 50.

The actuator plate 90 is configured to selectively engage the clutch to lock the inner plate 30 with the outer plate 70 (and thus the engine with the torque converter). The actuator plate 90 may be configured to translate linearly along the axis 12 in response to a powered actuator (not shown), such as an electromagnetic or hydraulic actuator. The powered actuator may force pins to press against the actuator plate 90 to move the actuator plate in the axial direction along the axis 12. The actuator plate 90 has a short stroke along the axis 12 to switch the clutch between a locked mode (in which the inner plate 30 and outer plate 70 are non-rotatably coupled) and an unlocked mode (in which the inner plate 30 and the outer plate 70 can rotate relative to one another).

Referring to FIGS. 1-4B, the actuator plate 90 may be annular in shape with a cylindrical outer surface 92 and a cylindrical inner surface 94. The actuator plate 90 may also include a plurality of tabs 96 extending in the axial direction parallel to the axis 12. Each tab 96 is configured to fit within a respective one of the gaps 58 between two adjacent wedge segments 50. The tabs 96 may be tapered or chamfered to facilitate a gradual separation and expansion of the gap 58 during actuation of the clutch.

Figure 4B:
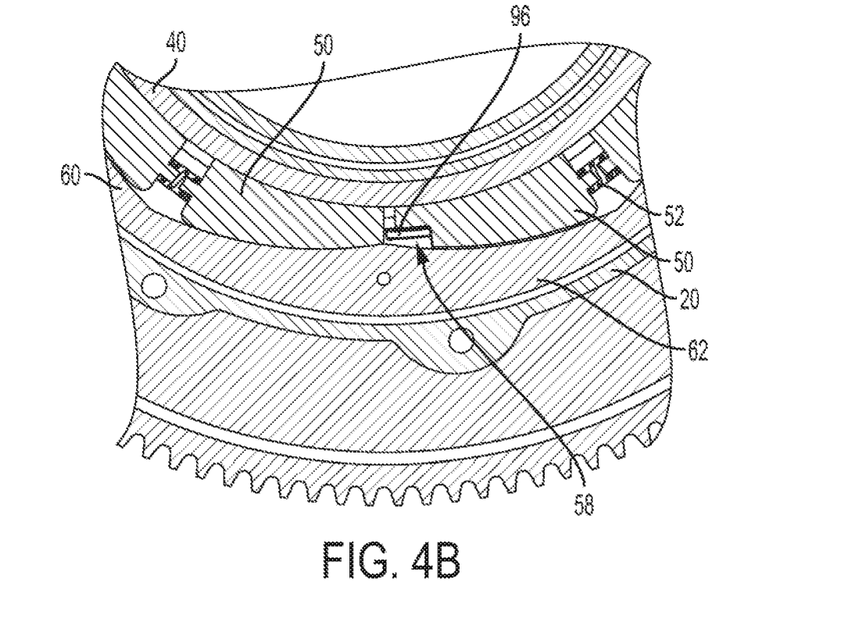
FIG. 4B is a plan view of a segment of the switchable clutch assembly, in which the clutch is in an unlocked mode.

The clutch is biased in the locked mode via springs 52 that separate two adjacent wedge segments 50. As shown in FIGS. 4A-4B, the springs 52 are radially aligned with an outermost region of the inner surface 64 of the outer race 60, while the tabs 96 are radially aligned with an innermost region of the outer race 60. The springs 52 are biased so as to minimize the gaps 58. This maintains the wedge plate 50 in a radially-constrictive position in which the wedge plate 50 assumes a first diameter. In the locked mode, at least some of the wedge segments 50 are located at a first radial distance from the axis 12. Each wedge segment 50 is wedged between the inner and outer races 40, 60. In particular, the inner-most region of the outer race 60 defines a wedge point; as the wedge segments 50 are forced into the region between the inner race 40 and the inner-most region of the outer race 60, the wedge segments 50 are "wedged" therebetween, to lock the inner race 40 to the outer race 60.

To unlock the clutch, the actuator plate 90 is engaged to move axially along the axis 12. The tabs 96 are forced in the gaps 58. This causes the wedge segments 50 to separate from one another, expanding the size of the gaps 58 against the force of the springs 52. At least some of the wedge segments 50 move circumferentially relative to the outer race 60. In particular, the outer surfaces 56 of the wedge segments 50 slide along the tapered inner surfaces 66 of the outer race 60, away from the inner-most region of the outer race 60. This "unwedges" the wedge segments 50 from between the inner race 40 and the outer race 60. This maintains the wedge plate 50 in a radially-expansive position in which the wedge plate 50 assumes a second diameter larger than the first diameter.

When the actuator plate 90 is commanded to retract in the axial direction, the tabs 96 can pull out of the gaps 58. This allows the springs 52 to force the wedge segments 50 toward its radially-constrictive position, locking the clutch by wedging the wedge segments 50 between the inner race 40 and the outer race 60.

In the embodiment shown in FIGS. 1-4B, the clutch assembly is integrated into the flex plate. This allows torque passing through the flexplate to be selectively disconnected. In other words, when the clutch is open or disengaged, torque does not pass through the flexplate (e.g., between the torque converter and the engine). And, when the clutch is closed or engaged, torque is enabled to pass through the flexplate (e.g., between the torque converter and the engine).

Figure 5:
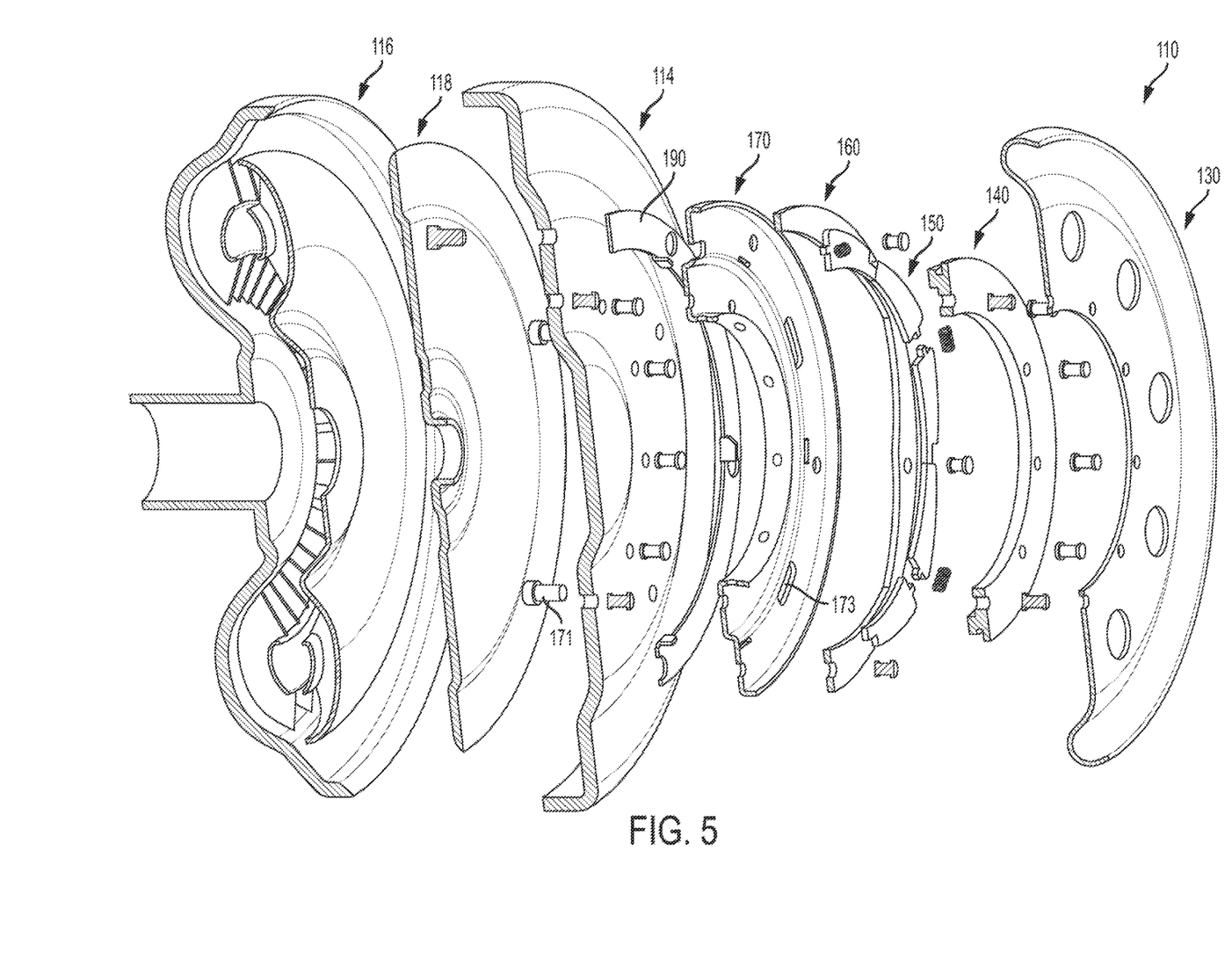
FIG. 5 is an exploded perspective view of a switchable clutch assembly (e.g., including wedge clutch) for selectively connecting a power source (such as an engine) with a torque converter, according to another embodiment.
Figure 6:
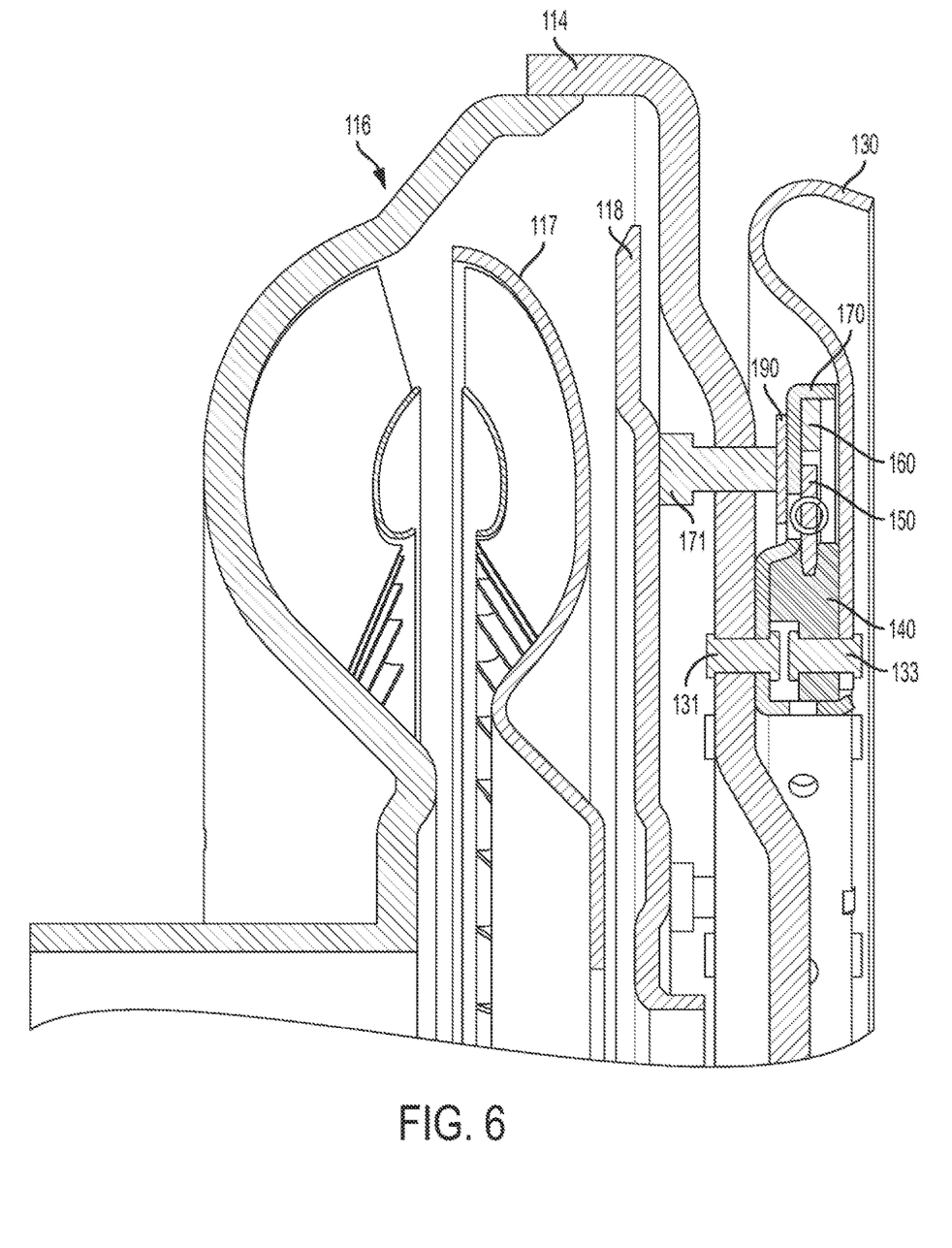
FIG. 6 is a cross-sectional view of the flexplate with integrated switchable clutch of FIG. 5, according to one embodiment.

FIGS. 5 and 6 illustrate a second embodiment of a clutch assembly between the engine output and the torque converter input in which similar elements are labeled by reference numbers that increase by 100. In this embodiment, the flexplate (not shown) can remain in-tact as a single component, and the clutch assembly can be axially between the torque converter housing and the flexplate. In this embodiment, a first plate 130, which can be an output of a damper assembly or a flexplate, is configured to rotate with the engine. A second plate 170 is configured to rotate with a torque converter cover 114. In particular, the second plate 170 directly contacts into the outer cover 114 of the torque converter 116 in a face-to-face relationship, connected via fasteners such as bolts.

In this embodiment, the torque converter 116 has a piston plate or piston 118 located within the torque converter 116 itself, axially between the turbine 117 and the cover 114. The piston 118 can be connected to or indirectly contacting the second plate 170 via pins 171 that extend through the cover 114 and into arcuate slots 173 formed in the second plate. This allows for slight relative circumferential rotation of the second plate relative to the cover 114. The pins 171 are also part of the actuation system for actuating the actuation plate 190, pressing against the axial face of the actuation plate 190 to move the plate 190 in the axial direction to lock or unlock the clutch. For example, a hydraulic system can be utilized to force the piston 118 axially, causing the pins 171 and connected actuation plate 190 to move axially as well to press the tabs into engagement between adjacent wedge segments (as described above with respect to FIGS. 4A-4B). The piston 118, the pins 171, and the actuation plate 190 are fixed to move as a unitary structure, and can therefore be either formed as a single component or can be individual components fixed or fastened to one another.

As can be seen in this embodiment shown in FIGS. 5-6, the clutch assembly is more compartmentalized and separate from the plate 130 (e.g., damper plate or flexplate) but is somewhat integrated into the torque converter itself with the piston 118 being located therein. This reduces the axial packaging length. In particular, part of the clutch housing (e.g., second plate 170) is riveted via rivets 131 directly to the torque converter cover 114. Instead of rivets 131, the clutch housing may be welded or otherwise fixed to the cover 114 so that it rotates with the cover 114. Likewise, one of the plates (e.g., first plate 130 that receives torque from the engine output) is riveted via rivets 133 directly to the inner hub 140 that defines the inner race of the clutch. Instead of rivets 133, the plate 130 can be welded or otherwise fixed to the inner hub 140 so that it rotates with the inner hub 140.

In some embodiments such as those described above, it should be understood that the wedge clutch may be modified such that the tapered surfaces are reversed. For example, the wedge segments 50 may have their circumferentially-tapered surfaces 56 on the inner surface rather than the outer surface. Likewise, the inner hub 40 would have tapered outer surfaces rather than a circumferential groove, and the outer race 60 would have a circumferential inner surface with a circumferential groove that receives the outer surface of the wedge plate.

In some embodiments such as those described above, it should also be understood that the wedge clutch may be modified such that the springs are configured to bias the clutch in the unlocked mode rather than the locked mode. For example, the location of the springs and tabs can be reversed such that the springs 52 are radially aligned with the inner-most region of the outer race 60, and the tabs 96 are radially aligned with the outer-most region of the inner surface 64 of the outer race 60. In this embodiment, insertion of the tabs would press the wedge segments toward the innermost region of the outer race 60, wedging the wedge segments 50 between the inner race 40 and the outer race 60.

Having a clutch integrated into the flexplate, such as the embodiments disclosed herein, allows the engine to be selectively disconnected from the torque converter. This allows the electric motor to drive the transmission without also having to backdrive the engine. There are certain driving conditions where it may be necessary to allow the engine to be back driven by the motor. The clutch disclosed herein therefore can operate in two modes: (1) fully locked in both rotational directions, and (2) locked in one direction and freewheeling in the other direction. The clutch in the flexplate can therefore be described as a switchable one-way clutch, or in more particular embodiments, a switchable one-way wedge clutch.

While terms such as "first" and "second" are used herein, it should be understood that those terms are for distinguishing between the two components, and can be interchanged depending on which term is used first. For example, a "first plate" described above can easily be referred to as the "second plate" in the claims for antecedent basis purposes.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Parts List

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

| | |
|---|---|
| 10 | flexplate |
| 12 | central axis |
| 14 | torque converter outer cover |
| 16 | torque converter |
| 20 | outer diameter (OD) bushing |
| 22 | inner surface |
| 24 | outer surface |
| 26 | apertures |
| 30 | inner plate |
| 32 | openings |
| 34 | outer surface |
| 40 | inner hub or inner race |
| 42 | inner surface |
| 44 | outer surface |
| 46 | annular groove in outer surface |
| 50 | wedge segments or wedge plate |
| 52 | springs |
| 54 | inner surfaces |
| 56 | outer surface |
| 58 | gaps |
| 60 | outer race |
| 62 | outer surface |
| 64 | inner surface |
| 66 | tapered surfaces |
| 70 | outer plate |
| 72 | openings |
| 74 | annular recess |
| 80 | inner diameter (ID) bushing |
| 82 | outwardly-facing surface |
| 90 | actuator plate |
| 92 | outer surface |
| 94 | inner surface |
| 96 | tabs |
| 110 | switchable clutch assembly |
| 114 | torque converter outer cover |
| 116 | torque converter |
| 118 | piston |
| 120 | OD bushing |
| 130 | first plate |
| 131 | rivets |
| 133 | rivets |
| 140 | inner hub |
| 150 | wedge segments or wedge plate |
| 160 | outer race |
| 170 | second plate |
| 171 | pins |
| 173 | slots |
| 180 | ID bushing |
| 190 | actuator plate |

What is claimed is:

1. A clutch assembly for selectively transmitting torque between an engine and a torque converter, the clutch assembly comprising:

a first plate non-rotatably connected to a torque converter cover;

a second plate configured to receive a torque input from an engine; and a wedge clutch disposed axially between the first and second plates and configured to selectively transfer torque between the first plate and the second plate, the wedge clutch including:
an inner race having an outer surface defining an annular groove,
an outer race concentric with the inner race, the outer race having an inner surface defining a plurality of tapered surfaces tapered in a circumferential direction, and
a plurality of wedge segments, each wedge segment having an inner surface disposed within the groove in a sliding engagement, and each wedge segment having a tapered outer surface tapered in the circumferential direction and engaged with a corresponding one of the plurality of tapered surfaces of the outer race, wherein the wedge segments are configured to collectively radially expand and contract to selectively transfer torque between the first plate and the second plate.

2. The clutch assembly of claim 1, wherein the inner race is axially bound between the first plate and the second plate.

3. The clutch assembly of claim 1, further comprising a plurality of springs, each spring located circumferentially between a respective pair of the wedge segments and biased to press the respective pair of the wedge segments toward a radially-innermost portion of the outer race to wedge between the inner and outer race to maintain the wedge clutch in a locked mode.

4. The clutch assembly of claim 3, further comprising an actuator plate configured to move axially to switch the clutch from the locked mode in which torque is transferable between the first plate and the second plate, to an unlocked mode in which torque is not transferable between the first plate and the second plate in at least one rotational direction.

5. The clutch assembly of claim 4, wherein the actuator plate includes tabs extending toward the wedge segments, wherein in the unlocked mode each tab is forced into a respective gap between two respective wedge segments to circumferentially separate the two respective wedge segments.

6. The clutch assembly of claim 5, wherein movement of the actuator plate in a first axial direction forces the wedge segments to slide circumferentially relative to the outer race and radially outwardly along the tapered surfaces of the outer race.

7. The clutch assembly of claim 5, wherein movement of the actuator plate in a second axial direction retracts the tabs from the gap to allow the springs to bias the wedge clutch in the locked mode.

8. The clutch assembly of claim 4, further comprising a pin extending through the torque converter cover and contacting the actuator plate.

9. The clutch assembly of claim 1, wherein the first plate and the second plate collectively form a flexplate.

10. The clutch assembly of claim 1, wherein the first plate is riveted or welded directly to the inner race of the clutch.

11. A clutch assembly for selectively transmitting torque between an engine and a torque converter, the clutch assembly comprising:
a first plate configured to non-rotatably connect with a torque converter;
a second plate configured to non-rotatably connect with an engine output; and
a wedge clutch configured to selectively transfer torque between the first plate and the second plate, the wedge clutch including:
a first race having a first surface defining an annular groove,
a second race concentric with the first race and having a second surface defining a plurality of ramped surfaces, and
a plurality of wedge segments, each wedge segment contacting the annular groove and a respective one of the ramped surfaces, wherein the wedge segments are configured to collectively radially expand and contract to selectively transfer torque between the first plate and the second plate.

12. The clutch assembly of claim 11, wherein each ramped surface extends about a central axis in a non-circumferential direction such that a thickness of the second race changes along the circumferential direction.

13. The clutch assembly of claim 12, wherein each wedge segment has a tapered surface that engages with a respective one of the ramped surfaces.

14. The clutch assembly of claim 13, further comprising a plurality of springs, each spring located circumferentially between a respective pair of the wedge segments and biased to force the respective pair of the wedge segments toward a radially-innermost portion or radially-outermost portion of the second race to wedge between the first and second races to lock the clutch.

15. The clutch assembly of claim 11, further comprising an actuator plate configured to move in an axial direction to switch the clutch between a locked mode and an unlocked mode.

16. The clutch assembly of claim 15, wherein the actuator plate includes a plurality of axially-extending tabs, each tab configured to extend through a gap between a respective pair of the wedge segments.

17. The clutch assembly of claim 16, wherein the clutch transitions between the locked mode and the unlocked mode as each tab forces a respective pair of the wedge segments to separate and slide along the ramped surfaces of the second race.

18. A system for selectively transferring torque between an engine and a torque converter, the system comprising:
a torque converter rotatable about an axis and having a cover;
a first plate configured to receive torque from an engine and transfer the torque to the torque converter;
a second plate disposed axially between the first plate and the cover and directly connected to the cover;
a clutch disposed axially between the first plate and the second plate;
a piston disposed within the cover and configured to move axially within the cover; and
an actuator plate coupled to the piston to move axially with the piston, wherein the actuator plate is configured to, in response to movement of the piston, switch the clutch between:
a locked mode in which torque is transferable between the first plate and the second plate, and
an unlocked mode in which torque is not transferable between the first plate and the second plate in at least one rotational direction.

19. The system of claim 18, wherein the clutch is a wedge clutch including:
a first race having a first surface defining an annular groove,
a second race concentric with the first race and having a second surface defining a plurality of ramped surfaces, and a plurality of wedge segments, each wedge segment contacting the annular groove and a respective one of the ramped surfaces.

20. The system of claim 19, wherein the actuator plate includes a plurality of tabs, each extending between a respective pair of the wedge segments, wherein axial movement of the actuator plate separates the wedge segments to switch the clutch from the locked mode to the unlocked mode or vice versa.

* * * * *